United States Patent [19]

Ohuchi et al.

[11] 3,886,256

[45] May 27, 1975

[54] STATOR CORE FOR ROTARY ELECTRIC MACHINES AND METHOD OF MANUFACTURING THE SAME

[75] Inventors: Yasushi Ohuchi, Hitachi; Toshiyuki Ebine, Katsuta; Takefumi Ohwada; Ryozo Tomozaki, both of Hitachi, all of Japan

[73] Assignee: Hitachi, Ltd., Japan

[22] Filed: Nov. 30, 1973

[21] Appl. No.: 420,571

Related U.S. Application Data

[62] Division of Ser. No. 275,154, July 26, 1972.

[30] Foreign Application Priority Data

July 30, 1971 Japan.............................. 46-56746

[52] U.S. Cl................ 310/216; 310/218; 310/259
[51] Int. Cl. .............................................. H02k 1/00

[58] Field of Search ............ 310/42, 216, 218, 254, 310/259

[56] References Cited
UNITED STATES PATENTS

| | | | |
|---|---|---|---|
| 3,270,231 | 8/1966 | Wiley................................ | 310/259 |
| 3,320,451 | 5/1967 | Wiley.............................. | 310/216 X |

*Primary Examiner*—Mark O. Budd
*Attorney, Agent, or Firm*—Craig & Antonelli

[57] ABSTRACT

A stator core for rotary electric machines, which is formed by helically and closely winding a steel strip formed by stamping with equally spaced inner slots defining a plurality of equally spaced tooth portions. The steel strip is also formed with notches each on each side of the stem portion of each tooth portion for the purpose of minimizing the plastic deformation stresses induced at the time of winding it.

8 Claims, 11 Drawing Figures

STATOR CORE FOR ROTARY ELECTRIC MACHINES AND METHOD OF MANUFACTURING THE SAME

This is a division of application Ser. No. 275,154 filed July 26, 1972.

BACKGROUND OF THE INVENTION

1. FIELD OF THE INVENTION

This invention relates to helical stator cores for small-size rotary electric machines.

2. DESCRIPTION OF THE PRIOR ART

The stator core of small-size rotary electric machines are usually manufactured by laminating a plurality of ring-like thin materials individually produced from a steel plate through press stamping.

The stamping process also produces waste material. It would be economical if the waste material could be effectively utilized, for instance, by producing steel discs for the rotor from it. This is, however, actually not done in practice because it is well known in the art that it is desirable to use various different materials to manufacture a rotor from the standpoint of obtaining improved performance. Therefore, manufacturing the stator core by laminating stamped steel materials is quite uneconomical.

To the primary end of saving the material, there have been developed various methods of manufacturing the so-called helical stator core by helically and closely winding a single steel strip. However, the characteristics of the helical stator core are influenced by the behavior of the material in the plastic mechanics thereof, and up to date there is no established technique for manufacturing stator cores having desired characteristics. The chief reason for this resides in that various plastic mechanics factors of the material are not constant while the stress distribution in the strip changes as the winding process proceeds, resulting in great deviations from geometrical dimensions required to obtain desired magnetic circuit characteristics.

Accordingly, in order to be able to obtain stator cores having optimum magnetic characteristics there is needed a method, in which the stress distribution in the material of the eventual helical core can be made optimum from the plastic mechanics standpoint in conformity to the material characteristics.

Besides, in practice such method should permit obtaining desired precision by helically winding a steel strip without requiring any cutting or machining process.

SUMMARY OF THE INVENTION

An object of the invention is to provide a stator core which can be obtained without requiring any cutting process at all.

Another object of the invention is to provide a stator core, in whose manufacture local deformations are intentionally produced at the stem of tooth portions for balancing stress distribution therein by so arranging that concentrated plastic deformation stresses are induced in the tooth portion stem in the step of helically and closely winding a steel strip and in the step of rendering the outer periphery of the helical winding or eventual stator core into circular form.

A still further object of the invention is to provide a stator core, in whose manufacture the opposite ends of the steel strip closely wound into the helical form are so arranged as to prevent deformation of tooth portions at the time of shaping the helical winding or lamination with respect to the thickness thereof.

One feature of the invention to achieve the above first and second objects resides in the provision of notches each on each side of the stem of each tooth portion of the steel strip. These notches have the effect of taking up plastic deformation stresses for balancing stress distribution in the tooth portion in the step of helically and closely winding the strip to form the eventual stator core.

A second feature of the invention to achieve the above third object resides in that the opposite ends of the steel strip wound into the helical form have outwardly acute contours and are fixed in position such that their outer acute corners lie in the same line extending in the outer periphery of and parallel to the axis of the helical winding to define in plan view an inwardly flaring angle, whereby deformation of tooth portions at the time of shaping the helical winding with respect to the thickness thereof can be prevented.

DESCRIPTION OF THE PREFERRED EMBODIMENTS

Preferred embodiments of the invention will now be described with reference to the accompanying drawing.

Figure 1:
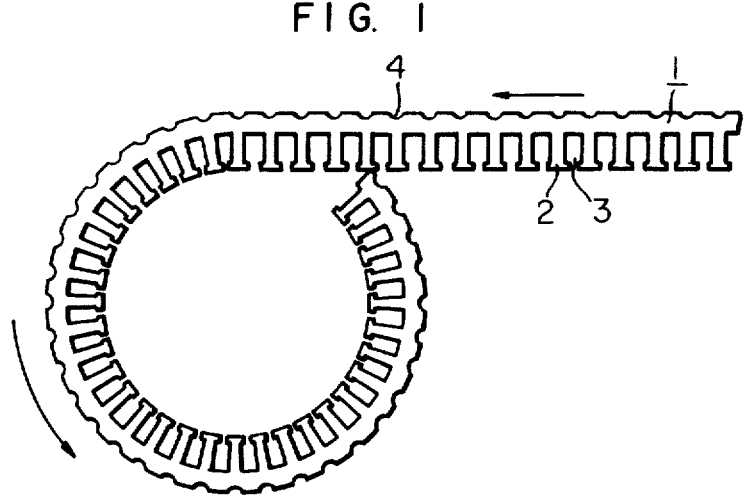
FIG. 1 is a plan view showing a steel strip for stator core according to the invention.

Referring to FIG. 1, numeral 1 designates a steel strip having a thickness of about 0.8 mm, which is formed on its one side with equally spaced slots 3 by means of stamping to define a plurality of equally spaced teeth 2. The strip 1 is helically and closely wound with the teeth directed inwards to form a stator core. The strip 1 is also formed with arcuate recesses 4 on its side opposite the teeth and individually in alignment with the respective teeth. These recesses serve to make it easier to helically wind the strip 1.

Figure 2:
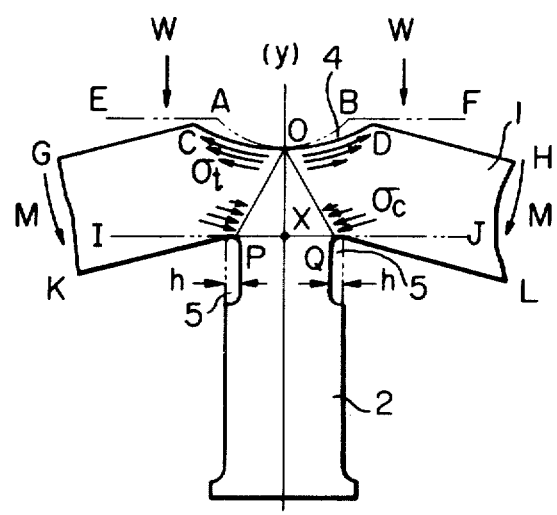
FIG. 2 is a fragmentary plan view, to an enlarged scale, showing part of the steel strip being helically wound.

FIG. 2 shows part of the strip being wound. With external force W, bending moment M is produced with respect to a central line OX in a tooth 2 and passing through the center of an associated outer recess 4. This bending moment induces local tensile and compressive stresses in the material of the portion EF and IJ of the strip 1 to result in corresponding plastic deformations.

The induced stress of course varies as the supporting point for the bending moment is shifted along line IJ. Accordingly, to reduce the induced stresses it is desirable to make the tooth as small as possible. However, reducing the cross sectional area of the tooth is undesirable from the magnetics standpoint, since by so doing the power generating efficiency is reduced. In this respect, it has been confirmed that it is effective to provide local notches 5 with a width h on opposite sides of the stem of the tooth 2. This is effective because with the notches 5 the distance of the supporting point for the bending moment from the center line OX is reduced. The width $h$ is desirably as large as possible within the permissible range from the performance standpoint. In the configuration of FIG. 2, with free elongation of the original portion OA into portion OC compressive stresses are produced on line OP connecting the center O of the recess and corner P of the notch, more particularly, on a line segment between a neutral point and point P. Thus, it is possible to minimize plastic deformation stresses for the tensile deformation in portion GCCDH and compressive deformation in portions KP and LQ to achieve geometrical formation or defining of the outer periphery and teeth-like inner periphery of the stator core.

Figure 10:
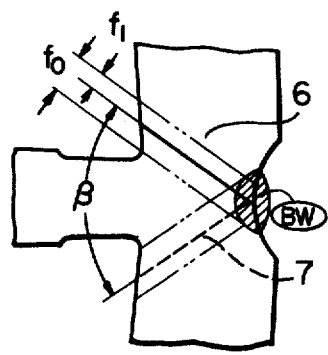
FIGS. 10 and 11 show, in fragmentary side view and front view, weld portions of a helical core embodying the invention.
Figure 11:
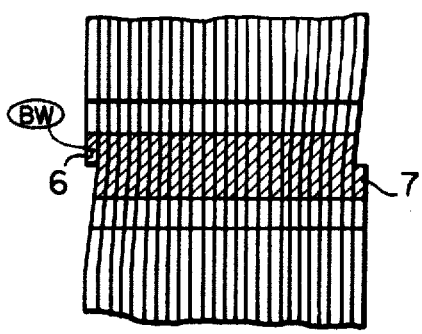

The opposite ends 6 and 7 of the strip helically wound into a stator core are fixed in position by means of welding, as shown in FIGS. 10 and 11.

Figure 3:
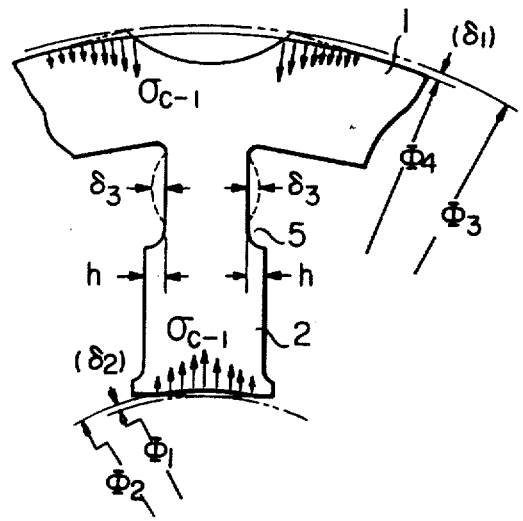
FIG. 3 is a fragmentary plan view, showing a helically wound stator core subjected to the step of rendering its outer periphery into circular form.

The core thus formed will not usually take a regular circular form but will rather take a polygonal form. However, it is well known that the core is ideally circular. The intended geometrically circular form may be substantially obtained through a coining treatment. For example, through coining a quasi-circumscribing circle labeled $\phi_3$ is changed to one labeled $\phi_4$ and a quasi-inscribing circle labeled $\phi_1$ is changed to one labeled $\phi_2$, as shown in FIG. 3.

The coining process, however, naturally gives rise to the generation of plastic deformation stresses in portions of the core adjacent to the resultant inner and outer peripheries $\phi_2$ and $\phi_4$, which results in corresponding residual distortions. The most critical deformation is the buckling of the teeth. If this takes place, the path for the windings for magnetizing the stator core is shut off. One measure against this is to locally confine the induced deformation stresses. A second measure is to minimize the deformation stresses induced in the coining process.

Regarding the first measure, the afore-mentioned notches 5 have pronounced effects. By virtue of the notches 5 the plastic deformation stress induced radially (in the direction of the length of the tooth) is converted into free expansional deformation as shown by dashed lines to the effect of relieving the induced stress.

Figure 4:
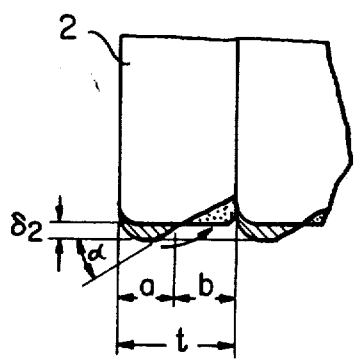
FIGS. 4 and 5 are fragmentary views, to an enlarged scale, showing part of the same.
Figure 5:
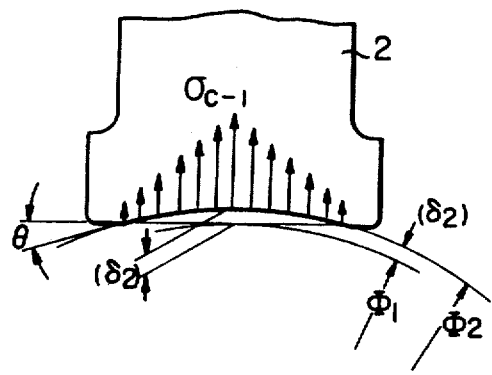

The second measure has resort to a concrete and effective coining means with which no excessive coining stress will be generated. FIG. 4 shows a fragmentary side view to an enlarged scale of a lamination of tooth portions. As is shown, about one-third of the lamination area brought into forced contact with a press is sheared as indicated at $a$ while the remaining two-thirds of the area is broken as indicated at $b$. The resultant area is inclined by an angle $\alpha$. (Of course, this slope also depends upon the stamping conditions.) Accordingly, in the plan view of FIG. 5 it is effective to arrange such as to make the area subjected to the coining process as small as possible, whereby the induced plastic deformation stress may be minimized.

In forming a stator core by helically winding a single strip material, the treatment of the opposite ends of the strip is very important in view of the plastic processing.

Figure 6:
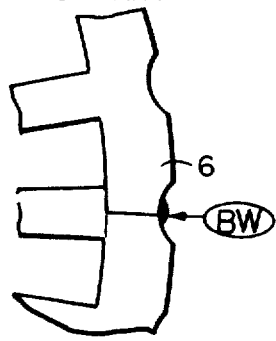
FIGS. 6 and 7 show, in fragmentary side view and front view, weld portions of a prior-art helical core.
Figure 7:
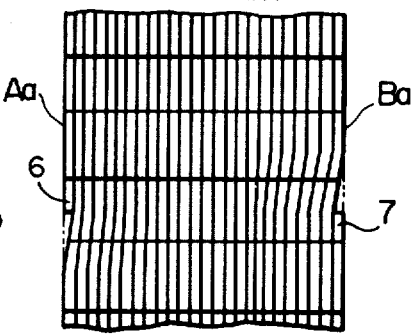

From the geometrical standpoint, it is generally desirable that both ends 6 and 7 radially coincide, as shown in FIGS. 6 and 7. Usually, however, the precision of the coincidence constitutes a problem in that if both ends overlap it makes it difficult to obtain precision parallelizm of both sides $A_a$ and $B_a$ of the core. Besides, even if precise coincidence of the opposite ends could be obtained, to render the opposite sides $A_a$ and $B_a$ parallel local plastic deformations are inevitable, which require excessive force in plastic processing which is thus unsuitable to mass production.

Figure 8:
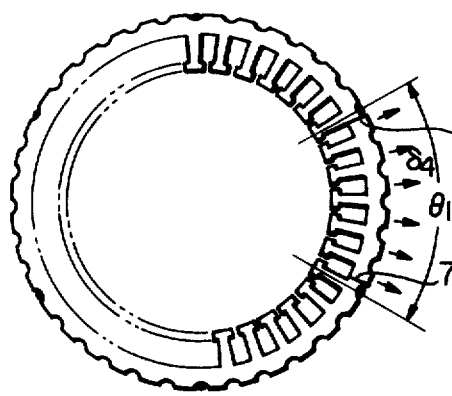
FIGS. 8 and 9 show, in fragmentary side view and front view, weld portions of another prior-art helical core.
Figure 9:
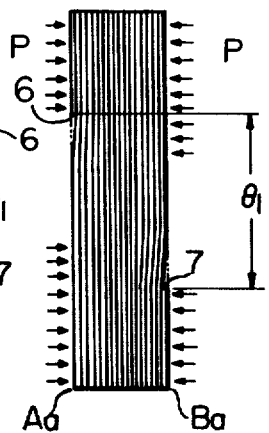

The above inconvenience may be avoided by providing an angle $\theta_1$ between the opposite ends 6 and 7, as shown in FIGS. 8 and 9. In this case, however, in the press step of rendering the opposite sides $A_a$ and $B_a$ parallel local unbalance of the static horizontal load is given rise to, so that a geometrically eliptical outer and inner peripheries result.

According to the invention, the opposite ends 6 and 7 define an angle $\beta$ in plan view, as shown in FIG. 10. More particularly, the opposite end portions 6 and 7 are outwardly acute and fixed by welding in position such that their outer acute corners lie in a central line of a recess 4 at the back of a tooth lamination 2 and they define an inwardly flaring angle $\beta$ in plan view.

With this construction, slight dimensional errors are deemed to be manifested at the outer acute corners. Thus, slight overlapping or deficiency may be sufficiently corrected with fusion technique. Of course, from the standpoint of minimizing the deformation of the tooth portions of the core the angle $\beta$ is desirably as large as possible, and it is suitably selected according to the size of the core and the thickness of the strip.

As has been described in the foregoing, according to the invention it is possible to obtain a helical stator core, which is less subject to magnetic noise, inexpensive and excellent in productivity, and which can be manufactured on the mass production basis without any cutting process through a series of manufacturing steps incorporating a unique structure of the workpiece to aid in minimizing the stresses induced in the tooth portions of the eventual core and a step of treating the opposite ends of the workpiece without affecting the tooth portions of the core at all.

We claim:

1. A stator core for rotary electric machines, said stator core being in the form of a helically and closely wound steel strip, the inner side of said wound steel strip having equally spaced slots defining a plurality of equally spaced tooth portions, each of said tooth portions having a recess on the opposite edges of the stem portion thereof, each recess extending from the tail portion of its associated tooth to a location intermediate the stem portion of said associated tooth, each recess having a notch extending from said tail portion of its associated tooth to a location intermediate the associated recess, said notches serving to minimize plastic deformation stresses induced at the time of winding said steel strip.

2. The stator core for rotary electric machines according to claim 1, wherein said steel strip is also formed with circular recesses individually in the head of the respective tooth portions.

3. The stator core for rotary electric machines according to claim 1, wherein the opposite end portions of said steel strip closely wound into the helical form substantially lie in the same straight line drawn across the center of a recess at the back of a tooth portion of said core.

4. A stator core for rotary electric machines, said stator core provided with a plurality of equally spaced slots defining a plurality of equally spaced and inwardly extending teeth, each of said teeth including a stem portion and a head portion at the free end of said stem portion, said stator core being in the form of a helically and closely wound steel strip having two free ends and formed on one side thereof with said equally spaced slots defining said plurality of equally spaced teeth, each of said free ends of said steel strip forming an acute angle with the longitudinal axis of said strip, the vertices of the acute angles lying along a line parallel to the central axis of said stator core, said ends in superposition seen in plan view forming an inwardly flaring angle.

5. The stator core as defined in claim 4 wherein said inwardly flaring angle subtends at least one of said teeth.

6. The stator core as defined in claim 4 wherein the inner edge portion of said head portion of each tooth at said free end of said stem portion is in the form of an arcuate recess portion with flat portions on opposite sides of said arcuate recess portion, each said arcuate recess portion lying along the circumference of a circle.

7. The stator core as defined in claim 4 wherein said slots include notches formed on opposite sides of the stem portion of each tooth to minimize plastic deformation of said teeth of said stator core.

8. The stator core as defined in claim 4 wherein each of said teeth has a recess on the opposite edges of the stem portion thereof, each recess extending from the tail portion of its associated tooth to a location intermediate the stem portion of said associated tooth, each recess having a notch extending from said tail portion of its associated tooth to a location intermediate the associated recess, said notches serving to minimize plastic deformation of said teeth.

* * * * *